(12) United States Patent
Dwyer et al.

(10) Patent No.: US 10,401,378 B2
(45) Date of Patent: Sep. 3, 2019

(54) ACCELEROMETER

(71) Applicant: Honeywell International Inc., Morristown, NJ (US)

(72) Inventors: Paul W. Dwyer, Seattle, WA (US); Stephen F. Becka, North Bend, WA (US)

(73) Assignee: Honeywell International Inc., Morris Plains, NJ (US)

( * ) Notice: Subject to any disclaimer, the term of this patent is extended or adjusted under 35 U.S.C. 154(b) by 679 days.

(21) Appl. No.: 14/919,290

(22) Filed: Oct. 21, 2015

(65) Prior Publication Data

US 2017/0115321 A1  Apr. 27, 2017

(51) Int. Cl.
*G01P 15/125* (2006.01)
*G01P 15/13* (2006.01)
*G01P 15/08* (2006.01)

(52) U.S. Cl.
CPC .......... *G01P 15/125* (2013.01); *G01P 15/132* (2013.01); *G01P 2015/0828* (2013.01); *G01P 2015/0837* (2013.01)

(58) Field of Classification Search
CPC ..... G01P 2015/0817; G01P 2015/0828; G01P 2015/0805; G01P 15/132
See application file for complete search history.

(56) References Cited

U.S. PATENT DOCUMENTS

| | | | |
|---|---|---|---|
| 2,947,962 A | 8/1960 | Statham | |
| 4,182,187 A | 1/1980 | Hanson | |
| 4,726,228 A | 2/1988 | Norling | |
| 4,944,184 A | 7/1990 | Blake et al. | |
| 5,085,079 A | 2/1992 | Holdren et al. | |
| 5,212,984 A | 5/1993 | Norling et al. | |
| 5,287,744 A | 2/1994 | Norling et al. | |
| 5,600,067 A | 2/1997 | Rupnick et al. | |
| 5,644,083 A * | 7/1997 | Newell | G01P 1/003 73/514.13 |
| 5,969,250 A | 10/1999 | Greiff | |
| 6,776,042 B2 | 8/2004 | Pike et al. | |

(Continued)

FOREIGN PATENT DOCUMENTS

EP  2722676 A1  4/2014

OTHER PUBLICATIONS

Text Intended to Grant dated Feb. 2, 2018, from counterpart European Application No. 16194253.7, 51 pp.

(Continued)

*Primary Examiner* — Justin Seo
*Assistant Examiner* — John M Royston
(74) *Attorney, Agent, or Firm* — Shumaker & Sieffert, P.A.

(57) ABSTRACT

Accelerometers as disclosed herein include a proof mass assembly and an accelerometer support. In some examples, a combined height and a combined coefficient of thermal expansion (CTE) of the materials of the accelerometer support is configured to substantially match a CTE of material of the non-moving member with a height substantially similar to the combined height of the accelerometer support. In some examples, the accelerometer support is configured to connect to a center raised pad of the proof mass assembly and maintain a capacitance gap between a capacitance plate on a proof mass of the proof mass assembly and a portion of the non-moving member.

10 Claims, 7 Drawing Sheets

(56) References Cited

U.S. PATENT DOCUMENTS

| | | |
|---|---|---|
| 7,100,447 B2 | 9/2006 | Dwyer |
| 2014/0109673 A1 | 4/2014 | Roehnelt et al. |
| 2014/0116188 A1* | 5/2014 | Fujimoto ........... G01C 19/5621 74/5 R |
| 2016/0011229 A1 | 1/2016 | Dwyer et al. |

OTHER PUBLICATIONS

Response to Extended Search Report dated Jan. 19, 2017, from counterpart European Application No. 16194253.7 filed May 18, 2017, 24 pp.

Extended Search Report from counterpart European Application No. 16194253.7, dated Jan. 19, 2017, 6 pp.

* cited by examiner

ACCELEROMETER

TECHNICAL FIELD

The disclosure relates to accelerometers.

BACKGROUND

Some accelerometers include a capacitive pick-off system. For example, electrically conductive material (e.g., a capacitor plate) may be deposited on the upper surface of the proof mass, and similar electrically conductive material may be deposited on the lower surface of the proof mass. An acceleration or force applied along the sensitive axis of the accelerometer causes the proof mass to deflect either upwardly or downwardly causing the distance (e.g., a capacitive gap) between the pick-off capacitance plates and upper and lower non-moving members to vary. This variance in the capacitive gap causes a change in the capacitance of the capacitive elements, which is representative of the displacement of the proof mass along the sensitive axis. The change in the capacitance may be used as a displacement signal, which may be applied to a servo system that includes one or more electromagnets (e.g., a force-rebalancing coil) to return the proof mass to a null or at-rest position.

Thin film leads (e.g., wire bond connections) on the surface of the accelerometer provide electrical connections to the electrically conductive material and the electromagnets. Acceleration applied to the accelerometer may be determined by electronics based on the change in capacitance with respect to the capacitor plates or the drive current increase in the electromagnets to maintain the proof mass in the null position.

SUMMARY

This disclosure describes techniques, devices, and systems that may help reduce bias and bias instabilities in accelerometers, where bias is an accelerometer output in the absence of input forces (e.g., input acceleration or other forces). A processor of an accelerometer system may determine an acceleration value based on the accelerometer output and the bias. In some cases, a model of the performance of an accelerometer may be used to determine bias. As described herein, in some examples, errors in the model due to thermal effects (referred to herein as "thermal model error") may be reduced due at least in part to the configuration of the accelerometer. For example, hysteresis (i.e., the change in a null position of a proof mass), which can be one component of the thermal model error, may be reduced.

In one example, a proof mass assembly includes a proof mass; an inner hoop surrounding the proof mass; an outer hoop surrounding the inner hoop; one or more hoop flexures, wherein the one or more hoop flexures flexibly connect the inner hoop to the outer hoop; a center pad flexure comprising a center raised pad at a distal end of the center pad flexure, wherein the center pad flexure flexibly connects the center raised pad to the inner hoop; and two or more proof mass flexures, wherein the two or more proof mass flexures flexibly connect the proof mass to the inner hoop and allow the proof mass to move out of a plane defined by the inner hoop.

In another example, an accelerometer support device includes a non-moving member; a magnet comprising a recess, wherein the magnet is positioned on a first side of a portion of the non-moving member; a pole piece comprising an aperture, wherein the pole piece is positioned on a first side of the magnet, wherein the aperture of the pole piece and the recess of the magnet are aligned; and a pin positioned in the recess of the magnet and the aperture of the pole piece, wherein the pin extends from the recess of the magnet to above a first side of the pole piece, wherein a combined height and a combined coefficient of thermal expansion (CTE) of materials of the accelerometer support are configured to substantially match a CTE of a material of the non-moving member with a height substantially similar to the combined height of the accelerometer support.

In another example, an accelerometer includes a proof mass assembly comprising a proof mass and a plurality of raised pads including a center raised pad, wherein the proof mass is configured to displace in response to acceleration applied to the proof mass assembly; and an accelerometer support comprising a non-moving member; a magnet comprising a recess, wherein the magnet is positioned on a first side of a portion of the non-moving member; a pole piece comprising an aperture, wherein the pole piece is positioned on a first side of the magnet, wherein the aperture of the pole piece and the recess of the magnet are aligned; and a pin positioned in the recess of the magnet and the aperture of the pole piece, wherein the pin extends from the recess of the magnet to connect to the center raised pad; wherein a combined height and a combined coefficient of thermal expansion (CTE) of materials of the accelerometer support are configured to substantially match a CTE of material of the non-moving member with a height substantially similar to the combined height of the accelerometer support, and wherein the combined height and the combined CTE of the materials of the accelerometer support are configured to maintain a capacitance gap between the capacitance plate of the proof mass and a second portion of the non-moving member.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
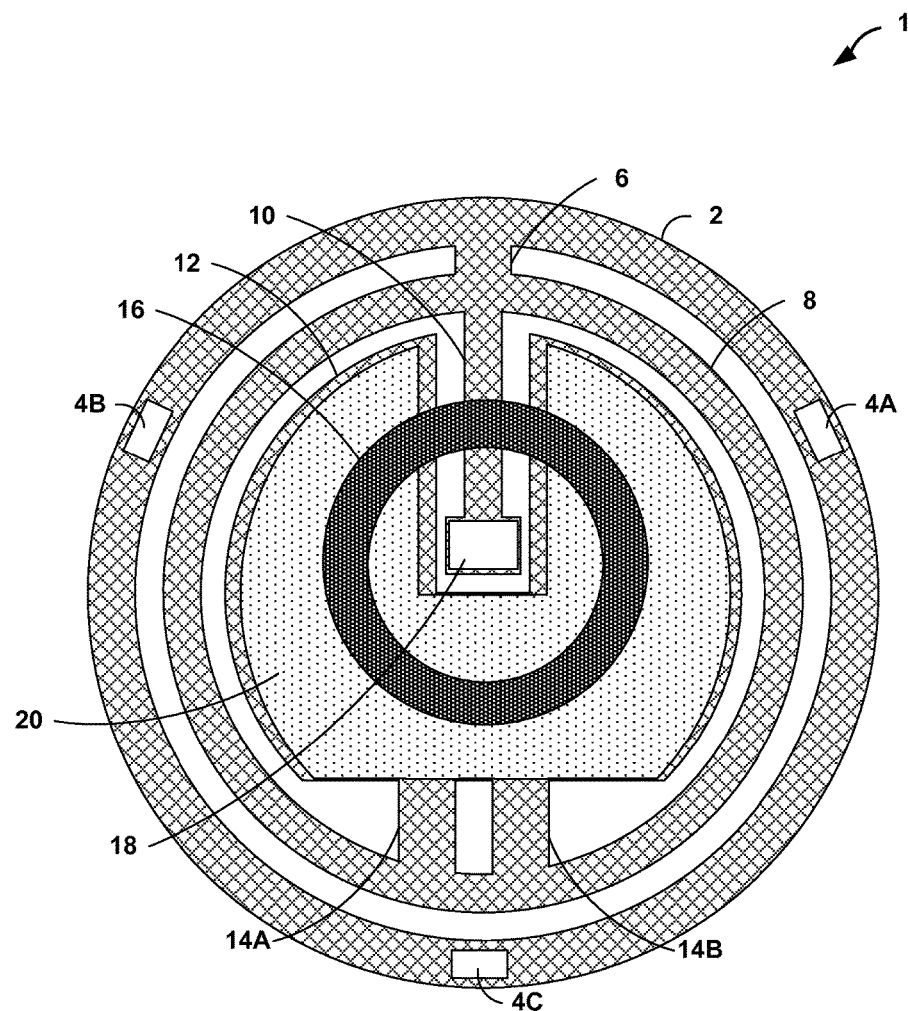
FIG. 1 is a conceptual diagram illustrating a top view of a proof mass assembly, in accordance with the techniques described herein.

Navigation systems and positioning systems used, for example, in aircraft, autonomous vehicles (e.g. "drones"), satellites, missiles, or other precision-guided systems, rely on the accuracy of accelerometers to perform operations, such as location determination, navigation, altitude determination, heading determination, active control of flight surfaces, and autopilot functions. Due to factors that will be discussed in more detail below, accelerometers exhibit bias, which refers to an accelerometer output in the absence of input forces (e.g., input acceleration or other forces). The accelerometer bias refers to an offset error, represented by an observed accelerometer output in the case where no acceleration is being applied along the accelerometer's sensitive axis. In other words, bias refers to the difference between an indicated acceleration and a true acceleration when the true acceleration is zero. To improve the accuracy of acceleration value determinations, this bias may be modeled at the time of manufacture so that accelerometer readings can be corrected to account for the bias. Errors in the model potentially may affect the accuracy of bias determination, which may reduce the accuracy of acceleration value determinations using the accelerometer.

One type of modeling error that may affect the accuracy of bias determination is thermal model error, which refers to errors introduced into the model as a result of the materials of the accelerometer being affected by temperature changes. Thermal model error may cause errors in bias determination, which may cause errors in accelerometer readings. In aerospace applications, these errors can lead, for example, to the inaccurate delivery of a payload or drifting from a desired flight path.

An accelerometer measures acceleration of a proof mass assembly with respect to an inertial reference frame. In some examples, an accelerometer may include an upper non-moving member above the proof mass assembly. The upper non-moving member and the proof mass assembly may collectively form part of an upper capacitive pick-off system (e.g., a first variable capacitor). For example, as the proof mass is displaced by acceleration of the accelerometer, the change in capacitance of a capacitance gap between the upper non-moving member and the capacitor plate on the top of the proof mass may be used as an indication of an amount of the displacement of the proof mass. The amount of displacement of the proof mass from an electrical null position is proportional to the magnitude of the acceleration incident upon the accelerometer. Thus, by measuring the change in capacitance between the upper non-moving member and the capacitor plate, an accelerometer can determine the acceleration experienced by the proof mass.

Additionally or alternatively, in some examples, an accelerometer may include a lower non-moving member below the proof mass assembly. The lower non-moving member and the proof mass assembly may collectively form part of a lower capacitive pick-off system (e.g., a second variable capacitor). As the proof mass is displaced by acceleration of the accelerometer, the change in capacitance of a capacitance gap between the lower non-moving member and the capacitor plate on the bottom of the proof mass may be used to determine an acceleration in a similar manner as described above for the upper capacitive pick-off system. The amount of displacement of the proof mass from an electrical null position may be proportional to the magnitude of the acceleration incident upon the accelerometer. Thus, by measuring the change in capacitance between the lower non-moving member and the capacitor plate, an accelerometer can determine the acceleration experienced by the proof mass.

In some examples, the upper and lower capacitive pick-off systems may be used as a combined capacitive pick-off system. In these examples, the combined pick-off system may provide linearization (e.g., a simplification of the algorithm used to determine an acceleration of the accelerometer) to the determination of an acceleration value. Although, the capacitive pick-off systems have been described as "upper" and "lower," these terms are only meant to differentiate between the capacitive pick-off systems and are not used to define any physical relationship unless stated otherwise.

In some examples, a non-moving member above and/or below the proof mass assembly and force-rebalance coils located on a first and/or a second side of the proof mass may form part of a force-rebalancing system. As acceleration of the accelerometer causes a force to be applied to the proof mass; in order to help maintain the proof mass position (e.g., prevent displacement of the proof mass as a result of this force), a servo increases the current in the force-rebalance coils to drive the differential capacitance from the combined capacitive pick-off system to zero, and thus maintain an electrical null position of the proof mass. The increase of current in the force-rebalance coils provides a force opposite to the force created by the acceleration. This opposite force maintains the electrical null position of the proof mass. The increase in current is proportional to the applied acceleration, and thus, the amount of current needed to maintain the electrical null position of the proof mass can be used to calculate the acceleration experienced by the accelerometer. Although, this example describes using the differential capacitance from the combined capacitive pick-off system, it is understood that the capacitance from either the upper or lower capacitive pick-off system may also be used individually by the servo to maintain the null position of the proof mass.

A proof mass has both a mechanical null position and an electrical null position. The mechanical null position of the proof mass is the physical location of the proof mass when no acceleration is applied to the proof mass or other influences, such as the servo system. The electrical null position of the proof mass is the physical location of the proof mass when no acceleration is applied to the proof mass, but is influenced by the servo system. In an ideal system, the mechanical null system is equal to the electrical null position. In real world systems, however, the electrical null position may be different than the mechanical null position because of the influence of the servo system. In other words, the electrical null position may not be at the mechanical null position because the servo system moves the proof mass to the electrical null position. This difference in location between the electrical null position and the mechanical null position of the proof mass may cause the proof mass flexures to apply forces to the proof mass, which may be a partial source of the bias of the accelerometer.

For example, if the capacitors on the proof mass change in capacitance, then a different electrical null position will be established by the servo system. This new electrical null position is a new bias, which results in a new bias error in the determination of acceleration values by a processor of the accelerometer system. Similarly, in another example, if the flexures of the proof mass change due to thermal expansion, then a different mechanical null position will be established. This new mechanical null position is a new bias, which results in a new bias error. The techniques and devices described herein reduce the new bias error by preventing or minimizing the changes in the electrical null position and the mechanical null position of the proof mass.

Hysteresis, as described herein, generally refers to the tendency of the proof mass to not return to a previous null position (e.g., the mechanical null position and/or the electrical null position) after forces and/or strains have been applied to the proof mass and removed. The mechanical null position and/or the electrical null position of the proof mass may change over time due to changes in the physical properties of the accelerometer components as a result of both use and temperature changes. For example, the mechanical null position and/or the electrical null position of the proof mass may change after forces and/or thermal strains have been applied to the accelerometer and then removed.

Additionally, non-ideal conditions during construction of an accelerometer can also cause errors in the bias model. For example, under ideal conditions, the material of the proof mass assembly (e.g., quartz or silicon) and the material of the non-moving members (e.g., invar or super invar) in an accelerometer are perfectly planar, resulting in no strains being generated when the non-moving members and the proof mass assembly are compressed together during assembly. Under normal manufacturing conditions, however, the material of the proof mass assembly and the non-moving members may define surface variations. As a result, the non-moving members may compress the proof mass assembly during construction of the accelerometer, which may place strains on the proof mass assembly. Further, these compressive forces remain on the proof mass assembly when a bellyband is applied to the non-moving members because the belly band compresses the proof mass assembly and the non-moving members to form the accelerometer.

At the time of manufacture, an accelerometer can undergo calibration procedures to develop a thermal model of the thermal behavior of the accelerometer in order to help determine bias present in accelerometer readings. While this thermal model may be relatively accurate at the time of manufacture, the accuracy of the thermal model, and thus the accuracy of the accelerometers, may degrade with use. For example, errors in the thermal model may start to appear after the calibration process. The heating and cooling of the accelerometer after determination of the thermal model may cause changes in the position of the proof mass position within the proof mass assembly and/or cause changes to the capacitive gaps between the proof mass and the non-moving members of the accelerometer. For example, non-moving members, magnets, pole pieces, bellybands, and epoxies of an accelerometer may have different coefficients of thermal expansion (CTE) than the materials of the proof mass assembly, causing the non-moving members, magnets, pole pieces, bellybands, and epoxies to change their physical structure with respect to the material of the proof mass assembly after being heated and/or cooled.

Additionally or alternatively, forces and/or strains placed on the accelerometer during construction may cause additional changes in the physical structure of the accelerometer to occur over time. Stresses placed on the accelerometer during construction may slowly relieve over time. Thus, the original thermal model determined for an accelerometer at the time of manufacture may become less accurate over time as these stresses relieve. To reduce the thermal model error, techniques and devices are disclosed herein that may prevent or minimize forces and/or strain placed on the accelerometer during construction and during use that may result in non-acceleration-dependent changes to the proof mass position and the capacitive gaps. In other words, techniques, devices, and systems disclosed herein may increase the stability of a thermal model of an accelerometer over temperature and time.

A proof mass assembly configured in accordance with the techniques of this disclosure may include a plurality of raised pads including a center raised pad located at the geometric center of the accelerometer. As will be explained in greater detail below, the plurality of raised pads may be configured to isolate the strain of the non-moving members (e.g., similar to a "stator" of a variable capacitor) and bellybands from the proof mass assembly.

In some examples of the techniques and devices of this disclosure, a plurality of raised pads of an outer hoop may mechanically isolate an inner hoop supporting the proof mass from the forces and/or strains caused by the bending of the non-moving members due to heating and cooling. In some examples, a center raised pad and an accelerometer support may mechanically isolate, in a zero gauge length configuration, an inner hoop supporting the proof mass from the forces and/or strains caused by the bending of the non-moving members due to the heating and cooling of the non-moving members. In some examples, the accelerometer support may allow for a dimensionally compensated suspension. For example, the dimensionally compensated suspension may be a combined height and a combined CTE of the different materials of an accelerometer support that substantially matches a height and a CTE of a material of the non-moving member.

FIG. 1 is a conceptual diagram illustrating a top view of a proof mass assembly configured in accordance with the techniques described herein. In the example of FIG. 1, proof mass assembly 1 includes outer hoop 2, raised pads 4A-4C (collectively "raised pads 4"), hoop flexure 6, inner hoop 8, center pad flexure 10, proof mass 12, proof mass flexures 14A and 14B (collectively "proof mass flexures 14"), coil 16, center raised pad 18, and capacitor plate 20.

In some examples, outer hoop 2, raised pads 4, hoop flexure 6, inner hoop 8, center pad flexure 10, proof mass 12, proof mass flexures 14, and center raised pad 18 may all be made of the same material (e.g., made from a monolithic material). In some examples, the monolithic material may be an amorphous glass (e.g. fused silica, Pyrex®, or Zerodor®). In some examples, the monolithic material may be a crystalline solid (e.g. silicon, titanium, or elgiloy). In other examples, only a portion of outer hoop 2, raised pads 4, hoop flexure 6, inner hoop 8, center pad flexure 10, proof mass 12, proof mass flexures 14, and center raised pad 18 may be made of the same material (e.g., made from monolithic material). In yet other examples, outer hoop 2, raised pads 4, hoop flexure 6, inner hoop 8, center pad flexure 10, proof mass 12, proof mass flexures 14, and center raised pad 18 may be made of different materials.

Outer hoop 2 provides flexible support to inner hoop 8 through hoop flexure 6, provides support to raised pads 4, and may also contain strains which may displace proof mass 12. In some examples, outer hoop 2 may define a plane in which proof mass 12, raised pads 4, and hoop flexure 6 are also located. In some examples, outer hoop 2 may be a piece of monolithic material with a plurality of features etched to form proof mass assembly 1. In some examples, outer hoop 2 may be made of quartz or silicon. Although outer hoop 2 as shown in FIG. 1 is a circular shape, it is contemplated that outer hoop 2 may be any shape (e.g., square, rectangular, oval, or the like).

Raised pads 4 separate proof mass 12 from non-moving members as described below in FIGS. 4 and 5. In some examples, the height of raised pads 4 may define the capacitive gaps (not shown) between the non-moving members and proof mass 12. In some examples, the height of raised pads 4 may be between half of one-thousandth to one-thousandth of an inch. In some examples, raised pads 4 may be on both sides of outer hoop 2. In some examples, raised pads 4 may receive the forces and/or strains from the non-moving members caused by construction or environment of the accelerometer.

In some examples, raised pads 4 may enable proof mass 12 to be mechanically isolated from transmission forces and/or thermal strains caused during construction. In some examples, raised pads 4 may provide frictional forces to the non-moving members (not shown) and prevent the non-moving members from shifting or slipping during construction of the accelerometer as described in FIGS. 4 and 5.

Hoop flexure 6 flexibly connects outer hoop 2 to inner hoop 8. In some examples, hoop flexure 6 may be stiff in the circumferential direction and the direction normal to the plane defined by outer hoop 2, which may enable hoop flexure 6 to mechanically isolate inner hoop 8 and proof mass 12 from the strain placed on raised pads 4 of outer hoop 2. In some examples, the height of hoop flexure 6 may be around thirty thousandths of an inch (e.g., 0.030 inches).

Inner hoop 8 provides support to proof mass 12 through proof mass flexures 14, support to center raised pad 18 through center pad flexure 10, and may contain strains which may also displace proof mass 12. In some examples, inner hoop 8 may define a plane in which proof mass 12, proof mass flexures 14, and center pad flexure 10 are also located. In some examples, inner hoop 8 may be a piece of monolithic material with a plurality of features etched to form proof mass assembly 1. In some examples, inner hoop 8 consists essentially of quartz or silicon. Although inner hoop 8 as shown in FIG. 1 is a circular shape, it is contemplated that inner hoop 8 may be any shape (e.g., square, rectangular, oval, or the like).

Center pad flexure 10 flexibly connects center raised pad 18 to inner hoop 8 and supports center raised pad 18 within inner hoop 8. In some examples, center pad flexure 10 may be stiff in the circumferential direction and in the direction normal to the plane defined by outer hoop 2, which may enable center pad flexure 10 to mechanically isolate inner hoop 8 and proof mass 12 from the strain placed on center raised pad 18. In some examples, the height of center pad flexure 10 may be around thirty thousandths of an inch (e.g., 0.030 inch).

Proof mass 12 is flexibly connected to inner hoop 8 with proof mass flexures 14 and configured to be moved out of the plane defined by inner hoop 8 in response to an acceleration of proof mass assembly 1. In some examples, proof mass 12 may contain C-shaped capacitor plates (not shown) on the top and the bottom of proof mass 12, which may provide a center of capacitance, and increases and decreases in capacitance at capacitive gaps with the non-moving members (not shown) as proof mass 12 is displaced.

Proof mass flexures 14 flexibly connect proof mass 12 to inner hoop 8 and supports proof mass 12 within inner hoop 8. In some examples, proof mass flexures 14 may enable proof mass 12 to move about the plane defined by inner hoop 8 due to acceleration of proof mass assembly 1. For example, proof mass flexures 14 may be stiff in radial and circumferential directions and flexible in a direction normal to the plane defined by outer hoop 2, and proof mass flexures 14 may allow proof mass 12 to be displaced out of the plane as defined by inner hoop 8 and/or outer hoop 2. In other words, proof mass flexures 14 may be configured to substantially isolate proof mass 12 from the forces and/or thermal strains of inner hoop 8. In some examples, proof mass flexures 14 may be on the order of a millimeter thick.

Coil 16 may be a force-rebalancing coil attached to a side of proof mass assembly 1. In some examples, coil 16 may be connected to electronics (not shown), which may serve to position proof mass 12 at a null position in a magnetic assembly. In some examples, the electronics may comprise one or more processors, such as one or more digital signal processors (DSPs), general purpose microprocessors, application specific integrated circuits (ASICs), field programmable logic arrays (FPGAs), or other equivalent integrated or discrete logic circuitry.

When acceleration is applied to an accelerometer including proof mass assembly 1 and magnetic assemblies, the electronics may increase the current in coil 16 to maintain proof mass 12 at the null position. The increase in current may be proportional to the amount of acceleration applied to the accelerometer. In some examples, the current in coil 16 may be increased by the electronics (e.g., a servo) to maintain the null position of proof mass 12 by driving the differential capacitance between the capacitor plates of proof mass 12 and the magnetic assemblies to zero. In these examples, the current increase in coil 16 may provide the opposite force required for maintaining the null position of proof mass 12. The increase in current is proportional to the applied acceleration of the accelerometer, and thus, electronics of the accelerometer may use a measurement of the current to determine an amount of acceleration.

Center raised pad 18 at a distal end of center pad flexure 10 connects to accelerometer supports as described below in FIGS. 4 and 5. In some examples, the height of center raised pad 18 may define the capacitive gaps (not shown) between the non-moving members and the capacitor plates (not shown) of proof mass 12. In some examples, the height of center raised pad 18 may be between half of one-thousandth to one-thousandth of an inch. In some examples, center raised pad 18 may be on both sides at the distal end of center pad flexure 10. In some examples, center raised pad 18 may receive the forces and/or strains from the accelerometer supports caused by construction of an accelerometer as described below in FIGS. 4 and 5. In some examples, center raised pad 18 may enable a zero gauge configuration of an accelerometer.

In some examples, center raised pad 18 may enable proof mass 12 to be mechanically isolated from forces and/or strains caused during construction or from the environment of an accelerometer. In some examples, center raised pad 18 may provide frictional forces to the accelerometer supports and prevent the non-moving members from shifting or slipping during construction of an accelerometer as described below in FIGS. 4 and 5.

In some examples, features of proof mass assembly 1 may be formed by a laser (e.g. a carbon dioxide laser) cutting gaps in a monolithic material. In these examples, the gaps may be around two thousandths of an inch thick. For example, the gap between outer hoop 2 and inner hoop 8 may be cut by the laser at two thousandths of an inch thick.

Capacitor plate 20 is an electrically conductive material located on one or more sides of proof mass 12. In some examples, capacitor plate 20 may be vapor deposited onto proof mass 12. In some examples, capacitor plate 20 may also be part of a pick off system in an accelerometer, where capacitor plate 20 forms a capacitive gap with a non-moving member of an accelerometer. In these examples, capacitor plate 20 may provide a signal to electronics to allow the electronics to servo coil 16 by increasing or decreasing current, which may maintain proof mass 12 in a null-position and the increased or decreased current is proportional to the acceleration applied to proof mass assembly 1.

In some examples, a centerline of a capacitor plate may pass through the center of the center raised pad, which may reduce a sensitivity of the accelerometer to tilting. In some examples, capacitor plate 20 may be similar to a rotor of a variable capacitor.

In the example of FIG. 1, raised pads 4 are located on outer hoop 2 between inner hoop 8 and the exterior of outer hoop 2. Although not shown in FIG. 1, in some examples, non-moving members may surround proof mass assembly 1 and may be attached to outer hoop 2 through raised pads 4. In some examples, outer hoop 2 may be configured to be more flexible than inner hoop 8, so that forces and thermal strains applied to outer hoop 2 through raised pads 4 may be reduced and/or isolated from inner hoop 8 and proof mass 12.

Outer hoop 2 may isolate the forces and thermal strains on proof mass assembly 1 by, for example, having hoop flexure 6 that may be thin (e.g., flexible) in the radial direction and stiff in the circumferential direction and the direction normal to the plane defined by outer hoop 2. In some examples, hoop flexure 6 may isolate inner hoop 8 from raised pads 4 to allow the non-moving members to expand radially over temperature while transmitting less strain to inner hoop 8, where the strain would cause the capacitor plates of proof mass 12 to move and create bias. In some examples, raised pads 4 may support the non-moving members during the construction of the accelerometer, which prevents the non-moving members from bending closer together from the compressive force applied by the bellyband as described in FIGS. 4 and 5. In some examples, the compressive force may be caused by the higher CTE of the bellyband than the CTEs of the quartz/invar stack, which the bellyband is attached to. For example, when the bellyband cools from the elevated cure temperature of the epoxy, the bellyband shrinks more than the quartz/invar stack and puts the quartz/invar stack into compression.

Proof mass assembly 1 may be configured in accordance with techniques of this disclosure to reduce thermal model error, which may enable the electronics to better determine the acceleration of proof mass assembly 1. In general, an accelerometer includes forces and/or strains, different CTEs, and epoxies, which will change the state of the accelerometer over time and temperature, causing hysteresis (i.e., a change in the mechanical and/or electrical null position of the proof mass) during the heating and cooling of construction and/or environment of the accelerometer. However, as the state of the accelerometer changes, raised pads 4 may help reduce thermal model error including the hysteresis caused during construction of the accelerometer. By providing outer hoop 2 with raised pads 4 flexibly connected to inner hoop 8 with hoop flexure 6, which is flexibly connected to proof mass 12 with proof mass flexures 14, there will be a reduction in the impact of having to calibrate the accelerometer after construction and over time. Moreover, raised pads 4 may prevent the non-moving members from altering the capacitive gaps between the accelerometer supports and the capacitive plates of proof mass 12, which may provide a more accurate capacitive gap, and a better determination of the actual acceleration. In other words, outer hoop 2 with raised pads 4 connected to inner hoop 8 with hoop flexure 6, and inner hoop 8 flexibly connected by proof mass flexures 14 to proof mass 12, may reduce the need to compensate for changes in the capacitive gaps of the accelerometer caused by forces and thermal strains applied to the accelerometer.

In the example of FIG. 1, center raised pad 18 is located at the distal end of center pad flexure 10 substantially near the center of proof mass 12. Center raised pad 18 may, for example, be within a perimeter defined by coil 16 and/or within a perimeter defined by the outer edges of proof mass 12. Although not shown in FIG. 1, in some examples, accelerometer supports may be above and below proof mass assembly 1 and may be connected to inner hoop 8 through center raised pad 18. In some examples, center pad flexure 10 may be configured to be flexible, so that forces and thermal strains applied to inner hoop 8 through center raised pad 18 may be reduced and/or isolated from inner hoop 8 and proof mass 12.

Inner hoop 8 may isolate the forces and thermal strains on proof mass assembly 1 by, for example, having center pad flexure 10 that may be thin (e.g., flexible) in the radial direction and stiff in the circumferential direction and the direction normal to the plane defined by inner hoop 8. In some examples, center pad flexure 10 may isolate inner hoop 8 from center raised pad 18 to allow the accelerometer supports to expand over temperature while transmitting less strain to inner hoop 8, where the strain would cause the capacitor plates of proof mass 12 to move and create bias. In some examples, center raised pad 18 may support the accelerometer supports. In these examples, the accelerometer supports may support the non-moving members, which may prevent the non-moving members from bending closer together from the compressive force applied by the bellyband as described in FIGS. 4 and 5. In some examples, the compressive force may be caused by the higher CTE of the bellyband than the CTEs of the accelerometer support stack. For example, when the bellyband and/or the non-moving members cool from the elevated cure temperature of the epoxy, the bellyband and/or non-moving members shrink more than the accelerometer support stack and may put the accelerometer support stack into compression. In some examples, where the non-moving members have no accelerometer supports, the non-moving members, which comprise the ground plane of the differential capacitors, may bend, producing bias.

Proof mass assembly 1 may be configured in accordance with techniques of this disclosure to reduce thermal model error, which may enable the electronics to better determine the acceleration of proof mass assembly 1. In general, an accelerometer includes forces and/or strains, different CTEs, and epoxies, which will change the state of the accelerometer over time and temperature, causing hysteresis (i.e., a change in the mechanical and/or electrical null position of the proof mass) during the heating and cooling of construction and/or environment of the accelerometer. However, as the state of the accelerometer changes, center raised pad 18 may help reduce the thermal model error including the hysteresis caused during construction and/or by the environment of proof mass assembly 1. By providing center raised pad 18 flexibly connected to inner hoop 8 at a distal end of center pad flexure 10, which is flexibly connected to proof mass 12 with proof mass flexures 14, there will be a reduction in the impact of having to calibrate the accelerometer after construction and over time. Moreover, center raised pad 18 and the accelerometer supports may prevent the non-moving members from altering the capacitive gaps between the non-moving members and the capacitive plates of proof mass 12, which may provide a more accurate capacitive gap, and a better determination of the actual acceleration. In other words, center raised pad 18 connected to inner hoop 8 with center pad flexure 10, and inner hoop 8 flexibly connected by proof mass flexures 14 to proof mass 12, may reduce the need to compensate for changes in the capacitive gaps of the accelerometer caused by forces and thermal strains applied to the accelerometer. It is contemplated in this disclosure that raised pads 4 and center raised pad 18 may be located and/or oriented anywhere on proof mass assembly 1 that strain isolation is desired.

In some examples, proof mass assembly 1 may include wire bond connections. In these examples, two wire bond connections may provide current to coil 16. In these examples, three additional wire bond connections may be used to servo proof mass assembly 1, where two of the three additional wire bond connections may be pick offs that provide a signal enabling the measurement of the capacitance, and the third additional wire bond connection may be a ground.

Figure 2:
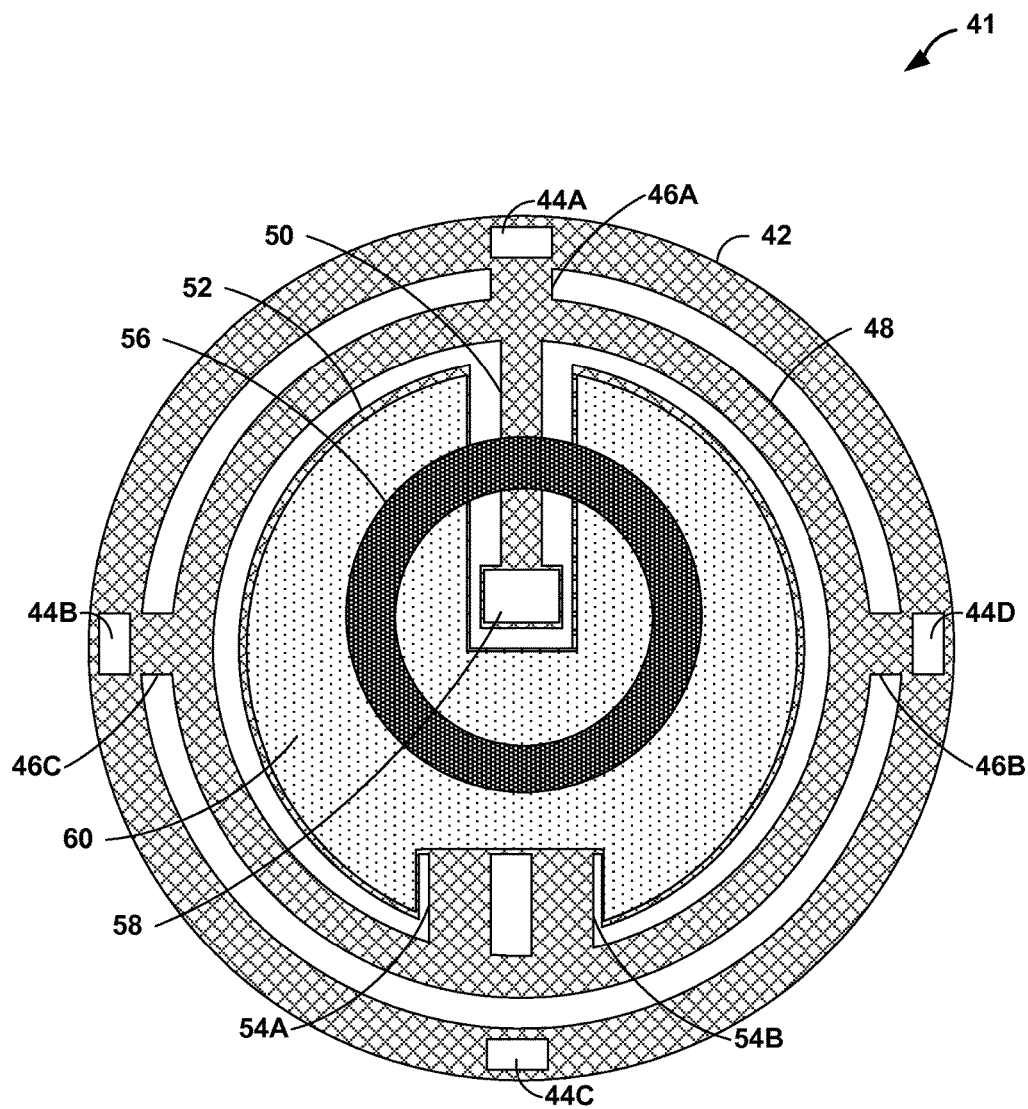
FIG. 2 is a block diagram illustrating another top view of a proof mass assembly, in accordance with the techniques described herein.

FIG. 2 is a conceptual diagram illustrating another example top view of proof mass assembly 41, in accordance with the techniques described herein. In the example of FIG. 2, proof mass assembly 41 includes outer hoop 42, raised pads 44A-44D (collectively "raised pads 44"), hoop flexures 46A-46C (collectively "hoop flexures 46"), inner hoop 48, center pad flexure 50, proof mass 52, proof mass flexures 54A and 54B (collectively "proof mass flexures 54"), coil 56, center raised pad 58, and capacitor plate 60, which may correspond to outer hoop 2, raised pads 4A-4C (collectively "raised pads 4"), hoop flexure 6, inner hoop 8, center pad flexure 10, proof mass 12, proof mass flexures 14A and 14B (collectively "proof mass flexures 14"), coil 16, center raised pad 18, and capacitor plate 20 respectively, as described in FIG. 1.

Hoop flexures 46 each may flexibly connect outer hoop 42 to inner hoop 48. In some examples, hoop flexures 46 may be stiff in the circumferential direction and the direction normal to the plane defined by outer hoop 42, which may enable hoop flexures 46 to mechanically isolate inner hoop 48 and proof mass 52 from the strain placed on raised pads 44 of outer hoop 42. In some examples, hoop flexures 46 may provide additional support to inner hoop 48 when compared to hoop flexure 6 and inner hoop 8. In some examples, hoop flexures 46 may provide more symmetrical support to inner hoop 48 when compared to hoop flexure 6 and inner hoop 8. In these examples, the symmetrical support of hoop flexures 46 may reduce the transmission of forces and/or thermal strains to inner hoop 48.

Capacitor plate 60 is an electrically conductive material located on one or more sides of proof mass 52. In some examples, capacitor plate 60 may be vapor deposited onto proof mass 52. In these examples, capacitor plate 60 may be configured to a capacitance center located at the center of gravity or tilt center of proof mass assembly 41. In other words, capacitor plate 60 may be formed with more or less electrically conductive material at particular locations that provide the capacitance center of capacitor plate 60 at the center of gravity of proof mass assembly 41. For example, capacitor plate 60 when compared to capacitor plate 20 of FIG. 1 is formed with additional electrically conductive material by proof mass flexures 54, which enables capacitor plate 60 to have a capacitance center closer to the center of gravity of proof mass assembly 41. In some examples, capacitor plate 60 may be similar to a rotor of a variable capacitor.

In the example of FIG. 2, proof mass 52 when compared to proof mass 12 of FIG. 1 may have additional material near proof mass flexures 54, which may allow the center of mass of proof mass 52 to be substantially near the center of proof mass assembly 41. In other words, proof mass 52 may be configured to have a center of mass located substantially near the center of proof mass assembly 41. In some examples, proof mass 52 having a center of mass located substantially near the center of proof mass assembly 41 may allow the capacitance center of the capacitor plates on proof mass 52 to be located at the tilt center of proof mass assembly 41. In some examples, proof mass 52 having a center of mass located substantially near the center of proof mass assembly 41 may allow the non-moving members to be symmetrical and easier to lap flat. In other words, the extra material located near proof mass flexures 54 may make the capacitance center of proof mass 52 coincident with the magnetic center of a magnetic circuit (not shown).

In some examples, without the capacitance center of proof mass 52 coincident with the magnetic center of the magnetic circuit, a portion of the magnet circuit may have to be cut out in order to align the magnetic center with the capacitance center. In some examples, with the capacitance center of proof mass 52 coincident with the magnetic center of the magnetic circuit provided by the additional material near proof mass flexures 54, the magnetic circuit may not require any cut outs, and may also be made symmetrical. In some examples, with a capacitance center of proof mass 52 coincident with the magnetic center of a symmetrical magnetic circuit may increase the accuracy of proof mass assembly 41 and an accelerometer with proof mass assembly 41.

Figure 3:
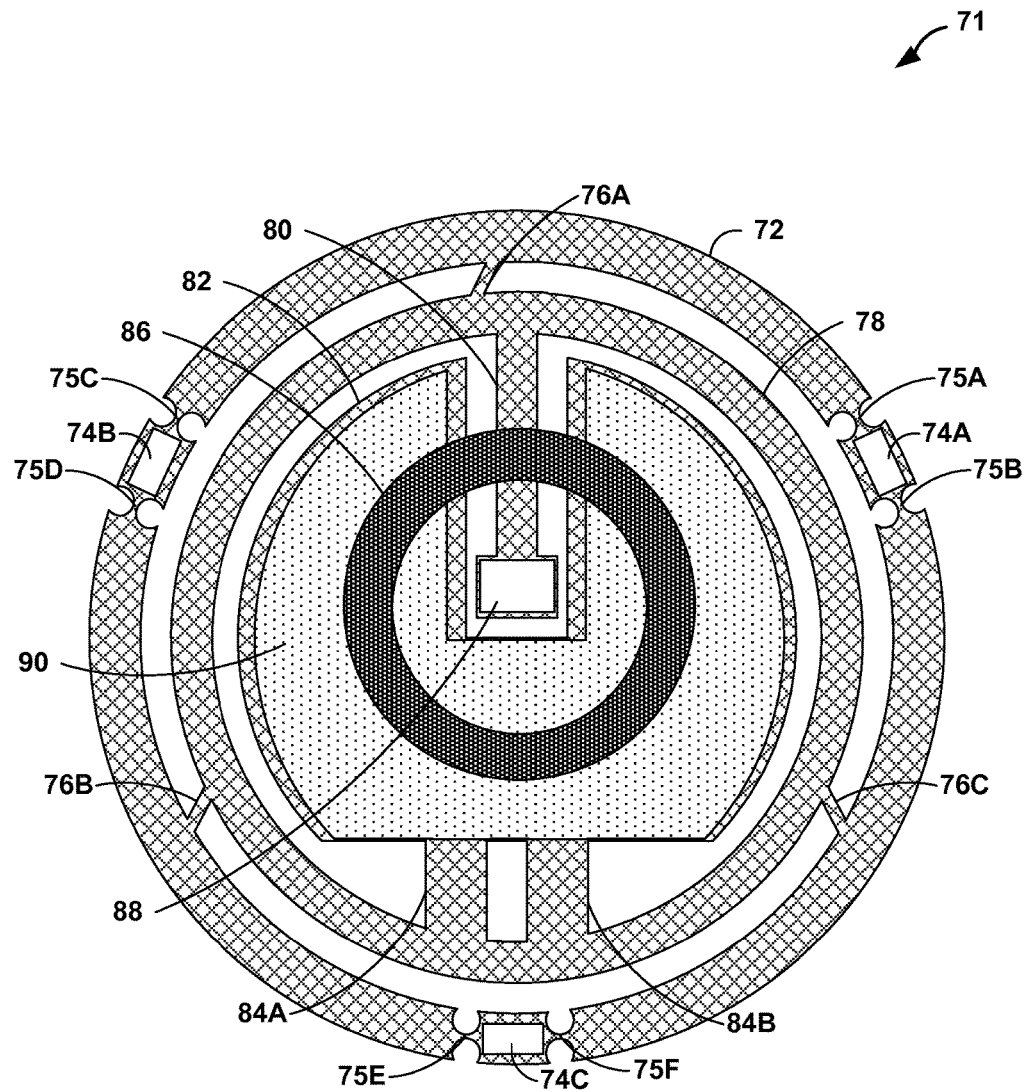
FIG. 3 is a block diagram illustrating another top view of a proof mass assembly, in accordance with the techniques described herein.

FIG. 3 is a conceptual diagram illustrating another example top view of proof mass assembly 71, in accordance with the techniques described herein. In the example of FIG. 3, proof mass assembly 71 includes outer hoop 72, raised pads 74A-74C (collectively "raised pads 74"), hoop flexures 76A-76C (collectively "hoop flexures 76"), inner hoop 78, center pad flexure 80, proof mass 82, proof mass flexures 84A and 84B (collectively "proof mass flexures 84"), coil 86, center raised pad 88, and capacitor plate 90, which may correspond to outer hoop 2, raised pads 4A-4C (collectively "raised pads 4"), hoop flexure 6, inner hoop 8, center pad flexure 10, proof mass 12, proof mass flexures 14A and 14B (collectively "proof mass flexures 14"), coil 16, center raised pad 18, and capacitor plate 20, respectively, as described in FIG. 1. In the example of FIG. 3, proof mass assembly 71 may further include pad flexures 75A-75F (collectively "pad flexures 75").

Pad flexures 75 are each a thin portion of quartz material located near an edge of raised pads 74, which may flexibly connected raised pads 74 to outer hoop 72. In some examples, pad flexures 75 may be flexible in the radial direction and stiff in the circumferential direction and the direction normal to plane defined by outer hoop 72. In some examples, pad flexures 75 may have a thickness on the order of one millimeter depending on the degree of isolation required for an acceptable performance. In some examples, pad flexures 75 may be laser cut flexures around raised pads 74 to allow for coefficient of thermal expansion mismatch between proof mass assembly 71 and the non-moving members of the accelerometer as described below in FIGS. 4 and 5.

Hoop flexures 76 each may flexibly connect outer hoop 72 to inner hoop 78. In some examples, hoop flexures 76 may be stiff in the circumferential direction and the direction normal to the plane defined by outer hoop 72, which may enable hoop flexures 76 to mechanically isolate inner hoop 78 and proof mass 82 from the strain placed on raised pads 74 of outer hoop 72. In some examples, hoop flexures 76 may provide additional support to inner hoop 78 when compared to hoop flexure 6 and inner hoop 8. In some examples, hoop flexures 76 may provide more symmetrical support to inner hoop 78 when compared to hoop flexure 6 and inner hoop 8. In these examples, the symmetrical support of hoop flexures 76 may reduce the transmission of forces and/or thermal strains to inner hoop 78. In some examples, hoop flexures 76 may be laser cut flexures between outer hoop 72 and inner hoop 78, which may isolate forces and/or strains caused by clamping non-moving members to outer hoop 72 from inner hoop 78 and proof mass 82.

Figure 4:
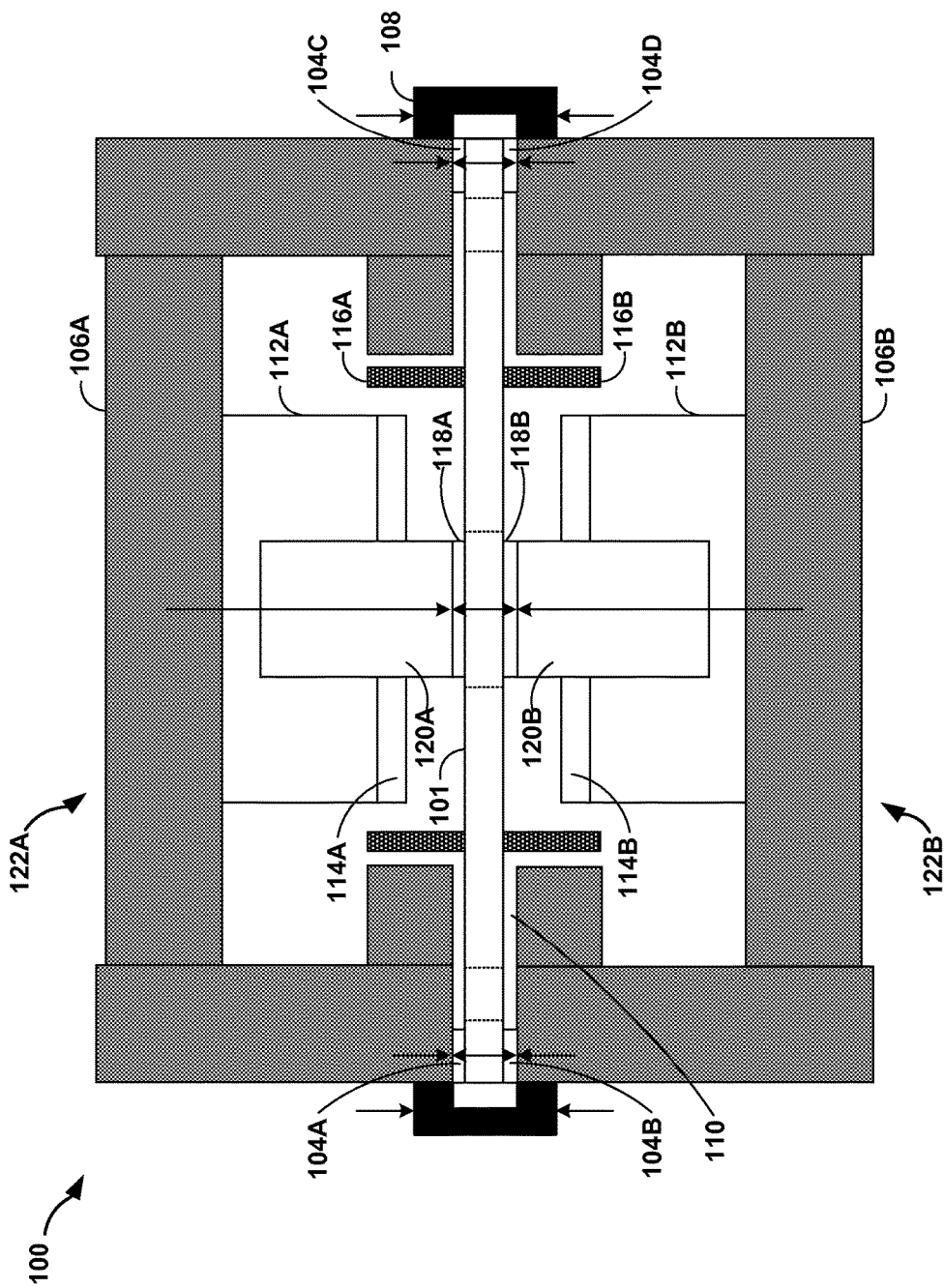
FIG. 4 is a conceptual diagram illustrating a cutaway view of an example accelerometer with forces and/or strains caused during construction.

FIG. 4 is a conceptual diagram illustrating a cutaway view of an example accelerometer with forces and/or strains caused during construction. In the example of FIG. 4, accelerometer 100 includes proof mass assembly 101, raised pads 104A-104D (collectively "raised pads 104"), force-rebalancing coils 116A-116B (collectively "force-rebalancing coils 116"), and center raised pads 118A and 118B (collectively "center raised pads 118"), which may correspond to proof mass assemblies 1, 41, and 71, raised pads 4, 44, and 74, coils 16, and center raised pad 18, respectively, as described in FIGS. 1-3. In the example of FIG. 4, accelerometer 100 further includes non-moving members 106A and 106B (collectively "non-moving members 106"), bellyband 108, capacitive gap 110, magnets 112A and 112B (collectively "magnets 112"), pole pieces 114A and 114B (collectively "pole pieces 114"), and pins 120A and 120B (collectively "pins 120"). In the example of FIG. 4, accelerometer 100 may include accelerometer supports 122A and 122B (collectively "accelerometer supports 122"), which may be formed by a combination of non-moving members 106, magnets 112, pole pieces 114, and pins 120. For example, accelerometer support 122A may be a combination of a base of non-moving member 106A, magnet 112A, pole piece 114A, and pins 120A. In another example, accelerometer support 122B may be a combination of a base of non-moving member 106B, magnet 112B, pole piece 114B, and pins 120B.

Non-moving members 106 are non-moving members, which may be attached to (e.g., clamped) raised pads 104 and center raised pads 118 of the proof mass assembly. In some examples, non-moving members 106 are dual metal parts, which may provide a magnetic return path. In some examples, non-moving members 106 may be similar to stators of a variable capacitor.

Bellyband 108 is a single metal piece which is a hoop-like structure with a slot in it which surrounds the exterior of non-moving members 106. In some examples, bellyband 108 may be attached to (e.g., bonded with epoxy) non-moving members 106, when non-moving members 106 are clamped to the proof mass assembly.

Capacitive gap 110 is a gap between capacitor plates (e.g., capacitor plates 20, 60, or 90 as described in FIGS. 1-3) on a proof mass (e.g., proof mass 12, 52, or 82 as described in FIGS. 1-3) and non-moving members 106 defined by raised pads 104 and center raised pads 118, which is the height of raised pads 104 and center raised pads 118 (e.g., around one thousandths of an inch on either side of the proof mass). In some examples, capacitive gap 110 may have a capacitance value. In these examples, other capacitive gaps between the proof mass and non-moving members 106 may have capacitance values. The electronics (not shown) may detect the capacitance values of capacitive gap 110 and/or the other capacitive gaps, which in a closed-loop differential capacitance configuration can be detected and used by the electronics (not shown) to determine the acceleration of accelerometer 100. For example, the increase in capacitive gap 110 and the decrease in the other capacitive gap opposite from capacitive gap 110 may be indicative of an acceleration applied to accelerometer 100. Conversely, the decrease in capacitive gap 110 and the increase in the other capacitive gap opposite from capacitive gap 110 may be indicative of an acceleration applied to accelerometer 100.

Magnets 112 are magnets for providing a magnetic field to drive magnetic circuits of magnets 112, pole pieces 114, force-rebalancing coils 116, and non-moving members 106. In some examples, magnets 112 may be made of Alnico, samarium-cobalt, neodymium-iron-boron, or other such materials. In some examples, magnets 112 may receive the forces and/or strains transmitted from non-moving members 106 caused by the construction of accelerometer 100. In some examples, magnets 112 may be part of a zero gauge configuration of accelerometer 100.

Pole pieces 114 are magnetic structure that enables the magnetic field of magnets 112 to be focused and drive the magnetic circuit of magnets 112, pole pieces 114, force-rebalancing coils 116, and non-moving members 106. For example, pole pieces 114 may be magnetic structures that enable the magnetic field of the magnet to turn a corner and flow through force rebalancing coils 116. In these examples, by allowing the magnetic field of magnets 112 to go through force-rebalancing coils 116, the magnetic field of magnets 112 may enter non-moving members 106 and flow around to the opposite side of the magnet through non-moving members 106, and flow back through the magnet to the pole piece completing the magnetic circuit.

In some examples, pole pieces 114 may receive the forces and/or strains transmitted from non-moving members 106 and magnets 112 caused by the construction of accelerometer 100. In some examples, pole pieces 114 may be part of a zero gauge configuration of accelerometer 100. In some examples, pole pieces 114 may be made from a permeable material such as invar, Mu Metal, Permalloy, or other such material.

Pins 120 are located in recesses of magnets 112 and connect magnets 112 to center raised pads 118 of proof mass assembly 101. In some examples, pins 120 may receive the forces and/or strains transmitted from non-moving members 106 through magnets 112 caused by the construction of accelerometer 100. In some examples, pins 120 may be part of a zero gauge configuration of accelerometer 100.

In some examples, pins 120 may be made of a material that has a similar CTE to that of non-moving member 106. The material chosen for the return path may affect the material chosen for pins 120. In some examples, pins 120 may enable proof mass assembly 101 to be mechanically isolated in a zero gauge length configuration from forces and/or strains caused during construction or from the environment of accelerometer 100. In some examples, pins 120 may provide frictional forces to center raised pads 118 and prevent non-moving members 106 from shifting or slipping during construction of accelerometer 100. The expansion over temperature of the support stack in the center may be selected to be essentially the same as that of the material used for the magnetic return path onto which the outside hoop of the fused silica part is clamped. If, for example, part of the center stack is composed of magnet material which has a higher CTE, then the balance of the center stack may be made of a material with a lower CTE than the material composing the magnetic return path to result in a center support stack which changes height over temperature in the same manner as the magnetic return path.

In some examples, accelerometer 100 may include force-rebalancing coils 116 attached on each side of the proof mass. In some examples, accelerometer 100 may include electronics (not shown) that servo force-rebalancing coils 116 to position the proof mass at a null position. In some examples, when acceleration is applied to accelerometer 100, the electronics may increase the current in force-rebalancing coils 116 to maintain the proof mass at the null position. In this example, the increase in current is proportional to the amount of acceleration applied to accelerometer 100.

In the example of FIG. 4, forces and/or strains (e.g., clamping forces and/or thermal strains) as indicated by the single arrows are produced during construction of accelerometer 100. For example, non-moving members 106 may be clamped onto proof mass assembly 101, which may place forces on raised pads 104 and center raised pads 118, and raised pads 104 and center raised pads 118 may support the forces as indicated by the double arrows. In this example, after clamping non-moving members 106 to proof mass assembly 101, bellyband 108 may be attached (e.g., bonded by an epoxy) to non-moving members 106 in order to hold non-moving members 106 in place.

In the example of FIG. 4, proof mass assembly 101 clamped by non-moving members 106 on the outside diameter which allows higher radial stresses to occur over temperature changes, which may change performance because the materials of proof mass assembly 101 and non-moving members 106 have different coefficients of thermal expansion. However, in some examples, center raised pads 118 of proof mass assembly 101 and accelerometer supports 122 may be connected in a zero gauge length configuration. In this way, the zero gauge length configuration minimizes the higher radial stresses by reducing the differences in length change from the center of accelerometer 100. In some examples, a zero gauge configuration may be expressed as Equation 1.

$$\Delta L = L \alpha \Delta T \qquad (1)$$

Equation 1 may be defined as the change in length ($\Delta L$) is equal to the length (L) multiplied by the coefficient of thermal expansion ($\alpha$) and the change in temperature ($\Delta T$). Since the coefficient of thermal expansion is different for fused quartz (e.g. material of the proof mass) and invar (e.g. material of the non-moving member), then the change in length between the proof mass and non-moving member 106 will be different. In this way, the stress will increase with increasing temperature as the length (L) of the system increases. In some examples, center raised pads 118 of proof mass assembly 101 and accelerometer supports 122 may decrease the length of the system (e.g., the length between the raised pads), which may then decrease the strain applied to proof mass assembly 101 from non-moving members 106. In other words, center raised pads 118 and accelerometer supports 122 may be configured to reduce the thermal strains transmitted to proof mass assembly 101 from non-moving members 106 by being positioned at the center of accelerometer 100 and producing a zero gauge configuration. In this way, locating center raised pads 118 and accelerometer supports 122 at the center of accelerometer 100 in addition to raised pads 104 minimizes the length of Equation 1, so the change in length is minimized. However, without center raised pads 118 and/or accelerometer supports 122, only raised pads 104 located on the outer hoop of proof mass assembly 101 will be attached to non-moving members 106, which may maximize the length of Equation, so the change in length would also be maximized.

In some examples, accelerometer 100 may be heated to a temperature to cure the epoxy between non-moving members 106 and bellyband 108. In these examples, the CTE is different between bellyband 108, non-moving members 106, the epoxy, and the other materials in accelerometer 100. The CTE mismatch causes the different materials to expand and contract at different rates. In some examples, the thermal strains from heating accelerometer 100 may cause non-moving members 106 to expand radially. The radial expansion of non-moving members 106 places forces on raised pads 104 as non-moving members 106 expand radially. In some examples, raised pads 104 may isolate and/or reduce the forces by flexing the hoop flexure as described in FIG. 1, while maintaining capacitive gap 110 between proof mass assembly 101 and non-moving members 106. In some examples, center raised pads 118 may isolate and/or reduce the forces by flexing the center pad flexure as described in FIG. 1, while maintaining capacitive gap 110 between proof mass assembly 101 and non-moving members 106.

In some examples, accelerometer 100 may cool after being heated to a temperature to cure the epoxy. In these examples, the different CTEs between bellyband 108, non-moving members 106, the epoxy, and the other materials in accelerometer 100 may cause the different components of accelerometer 100 to compress at different rates. In some examples, the strains caused by cooling accelerometer 100 may compress non-moving members 106. In these examples, in particular, bellyband 108 may compress non-moving members 106 onto raised pads 104 as illustrated by the single arrows at bellyband 108. In these examples, bellyband 108 may also compress accelerometer supports 122 onto center raised pads 118 as illustrated by the single arrows at accelerometer supports 122. The compression during cooling places forces on raised pads 104 and center raised pads 118, which may be indicated by the single arrows in non-moving members 106 and accelerometer supports 122, as non-moving members 106 are compressed together. In some examples, raised pads 104 may support the compression forces, which may be indicated by the double arrows, while maintaining capacitive gap 110 between proof mass assembly 101 and non-moving members 106. In some examples, center raised pads 118 may support the compression forces, which may be indicated by the double arrows, while maintaining capacitive gap 110 between proof mass assembly 101 and non-moving members 106.

In some examples, without center raised pads 118 and accelerometer supports 122, raised pads 104 may act as a cantilever on non-moving members 106, allowing non-moving members 106 to bend inward toward the proof mass. In these examples, without center raised pads 118 and accelerometer supports 122, the forces and/or strains placed on non-moving members 106 during construction may cause non-moving members 106 to be slightly bent as accelerometer 100 cools. In some examples, the bend in non-moving members 106 may alter capacitive gap 110 causing errors in the determination of an acceleration of accelerometer 100. In some examples, the bend in non-moving members 106 may require a calibration of accelerometer 100 after construction.

In some examples, non-moving members 106 and bellyband 108 may be comprised of invar which has a CTE of 2 parts-per-million (ppm) per degree centigrade. However, quartz, which proof mass assembly 101 may be composed of, has a CTE of 0.55 ppm per degree centigrade. The difference in the CTEs between invar and quartz affects accelerometer 100 when the temperature goes up, causing the metal parts (e.g., non-moving members 106, capacitor plates, etc.) that comprise the magnetic return path to expand faster than the quartz putting strains on the outer hoop of proof mass assembly 101 through raised pads 104. In some examples, raised pads 104 may slip when the strains are applied causing a hysteresis (i.e., a change in the mechanical and/or electrical null position of the proof mass) if proof mass assembly 101 is not realigned. In some examples, raised pads 104 may be able to flex with respect to non-moving members 106 so raised pads 104 may travel with non-moving members 106 and the outer hoop of proof mass assembly 101 remains while the deflection takes place occurs on the pad flexures which attach raised pads 104 to the outer hoop of proof mass assembly 101. In some examples, using raised pads 104 may allow the expansion of non-moving members 106 to cause less stress on proof mass assembly 101 and may prevent the change in capacitive gap 110 due the differences in CTEs.

In some examples, with respect to accelerometer supports 122, non-moving members 106 may be comprised of invar which has a CTE of 2 parts-per-million per degree centigrade (PPM/C). Non-moving member may also be comprised of super invar. In some examples, proof mass assembly 101 and pins 120 may be composed of quartz, which has a CTE of 0.55 PPM/C. In some examples, magnets 112 may be composed of Alnico, which has a CTE of 11 PPM/C. The difference in the CTEs between materials (e.g. invar and quartz) potentially affects accelerometer 100 when the temperature goes up, causing the metal parts (e.g., non-moving members 106, capacitor plates, magnets 112 etc.) that comprise the magnetic return path to expand faster than the quartz putting strains on the inner hoop of proof mass assembly 101 through center raised pads 118. In some examples, center raised pads 118 may be able to flex with respect to accelerometer supports 122 so center raised pads 118 may travel with accelerometer supports 122 and the inner hoop of proof mass assembly 101 remains while the deflection takes place occurs on the center pad flexure which attach center raised pads 118 to the inner hoop of proof mass assembly 101. In some examples, using center raised pads 118 may allow the expansion of accelerometer supports 122 to cause less stress on proof mass assembly 101 and may prevent the change in capacitive gap 110 due the differences in CTEs. In some examples, using center raised pads 118 may provide a more stable capacitance measurement after construction than only using raised pads 104 during construction. In some examples, center raised pads 118 and accelerometer supports 122 add additional support and friction to prevent the slippage associated with only raised pads 104 on the outer hoop of proof mass assembly 101.

In some examples, accelerometer supports 122 may be configured to substantially match the CTE of non-moving members 106 above and below raised pads 104, so that the forces and/or strains applied to center raised pads 118 substantially matches the forces and/or strains applied to raised pads 104. In other words, accelerometer supports 122 in addition to mechanically providing additional support and friction to center raised pads 118 may also be configured to substantially match a CTE and a height of a piece of magnetic material. For example, the heights and combination of CTEs of accelerometer supports 122 having a CTE of a base of non-moving members 106, a CTE of magnets 112, and a CTE of pins 120 may substantially match the height and CTE of non-moving members 106 above and below raised pads 104. In some examples, the heights of magnets 112 and pins 120 may be selected in order to substantially match the height and CTE of non-moving members 106 above and below raised pads 104. It is contemplated in FIG. 4 that accelerometer supports 122 may further include layers of adhesive or other bonding material with an associated height and CTE that is different from the CTEs of the other materials of accelerometer supports 122, which may be incorporated to substantially match the height and CTE of non-moving members 106 above and below raised pads 104.

In some examples, capacitor plates (not shown) are C-shaped and may be deposited via vapor deposition to the top and bottom of the proof mass of proof mass assembly 101 and electronics (not shown) close a loop with the capacitance plates (not shown). In some examples, the C-shaped geometry of the capacitor plate provides a center of capacitance, so if the capacitor plate is tilted, then the capacitor plate is less sensitive as the capacitance increases at a first end of the C-shape and decreases at a second end of the C-shape. In some examples, the geometry of proof mass assembly 101 may provide a center of capacitance of the capacitor plates at the tilt center of proof mass assembly 101, so if the accelerometer is tilted, then the capacitor plates are less sensitive as the capacitance increases at a first end of the C-shape and decreases at a second end of the C-shape. In some examples, displacement of the proof mass causes a change in capacitance between the top capacitor plate and the bottom capacitor plate. In some examples, the change in capacitance between the top and bottom capacitor plates may be used by the electronics to determine the acceleration of accelerometer 100.

Additionally, coil forms with force-rebalance coils 116 may be mounted on either side of the proof mass of proof mass assembly 101. In some examples, the electronics may modify the current in the force-rebalance coils to servo the proof mass to maintain a null position. Any acceleration of accelerometer 100 will move the proof mass of proof mass assembly 101 out of the plane defined by the inner hoop and the increase in current required to maintain the proof mass in the null position is proportional to the amount of acceleration that accelerometer 100 experiences.

In some examples, an accelerometer may include a proof mass assembly and an accelerometer support. In these examples, the proof mass assembly may include a proof mass comprising a capacitor plate, and a plurality of raised pads including a center raised pad, wherein the proof mass is configured to displace in response to acceleration applied to the proof mass assembly. In these examples, the accelerometer support may include a portion of a non-moving member, a magnet having a recess and positioned on a first side of the portion of the non-moving member, a pole piece comprising an aperture and positioned on a first side of the magnet, wherein the aperture of the pole piece and the recess of the magnet are aligned, and a pin positioned in the recess of the magnet and the aperture of the pole piece, wherein the pin extends from the recess of the magnet to connect to the center raised pad, wherein a combined height and a combined CTE of the materials of the accelerometer support is configured to substantially match a CTE of material of the non-moving member with a height substantially similar to the combined height of the accelerometer support, and wherein the combined height and the combined CTE of the materials of the accelerometer support is configured to maintain a capacitance gap between the capacitance plate of the proof mass and a second portion of the non-moving member. For example, a combined height and a combined CTE of materials of accelerometer support 122 are configured to substantially match a CTE of a material of the non-moving member 106 with a height substantially similar to the combined height of accelerometer support 122. In this context substantially match may refer to matching within the typical surface curvature of the metal parts within which an element (e.g. a fused quartz element) is clamped, which may, for example, be within 75 microinches over a desired temperature range.

In some examples, the cut-through features of proof mass assembly 101 may be produced using (in the case of a fused silica substrate) a carbon dioxide laser. In some examples, raised pads 104 which form the clamping sites as well as the flexures are formed by applying a suitable mask and performing chemical etching. In some examples, the magnetic circuits (e.g., a combination of non-moving members 106, magnets 112, pole pieces 114, and force-rebalancing coils 116) are assembled by constructing magnets 112 with a recess of a specific depth dimension such that the CTE of pins 120 (e.g., a fused quartz pin) plus the CTE from magnets 112 results in the same displacement over temperature as that of the non-moving member expansion on the outside clamping surface down to the base of non-moving member 106 where magnet 112 is attached. In some examples, pole piece 114 may have a center-hole (e.g., an aperture) and magnets 112 may be bonded to the center of non-moving members 106 which become the base of the magnetic circuits. In some examples, pins 120 may then be bonded into the recess formed in the magnet/pole piece stacks to complete accelerometer supports 122. In some examples, accelerometer supports 122 may then be aligned via tooling such that the top of pins 120 may be nominally in-plane with the top surface of a portion of non-moving members 106 and bonded. In some examples, the surface of accelerometer supports 122 and the surface of a portion of non-moving members 106 may be brought into plane with each other via an appropriate material removal process. In some examples, proof mass assembly 101 may then be formed by adding and/or attaching any additional structures to complete the pickoff and actuation components to the proof mass. In some examples, the magnetic circuits and proof mass assembly 101 are then assembled, and electrical and structural attachments are made to form accelerometer 100. In some examples, accelerometer 100 may further include bond joints to more firmly attach proof mass assembly 101 to pins 120.

Although, FIG. 4 illustrates accelerometer 100 with a capacitive plate on both sides of proof mass assembly 101 to form a combined capacitive pick-off system, it is understood that accelerometer 100 may function with a capacitor plate on only one side of proof mass assembly 101. Similarly, although FIG. 4 illustrates accelerometer 100 with a non-moving member on both sides of proof mass assembly 101 to form the combined capacitive pick-off system, it is understood that accelerometer 100 may function a non-moving member and a capacitor plate on the same side of proof mass assembly 101.

Figure 5:
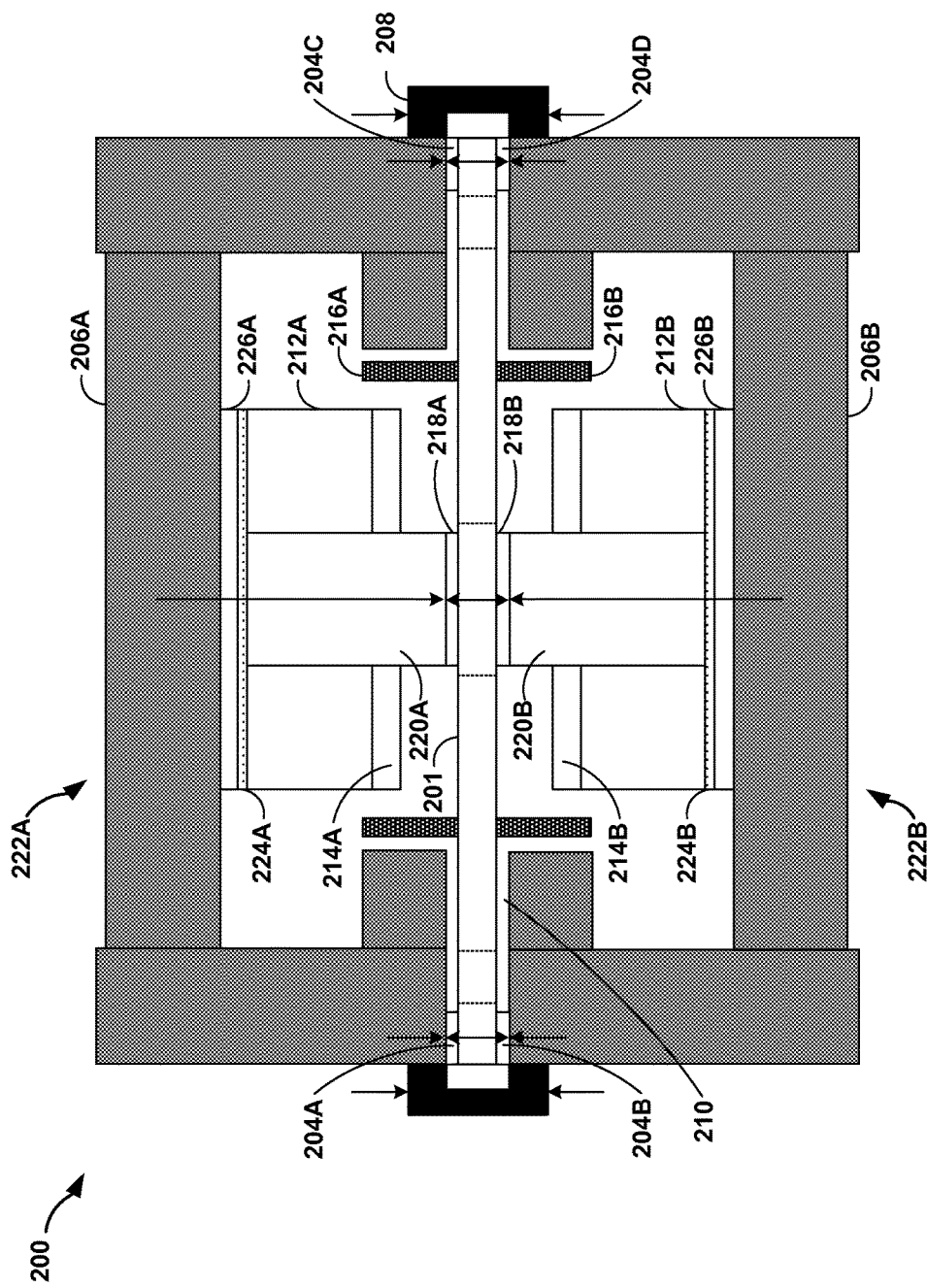
FIG. 5 is a conceptual diagram illustrating a cutaway view of another example accelerometer with forces and/or strains caused during construction.

FIG. 5 is a conceptual diagram illustrating a cutaway view of another example accelerometer with forces and/or strains caused during construction. In the example of FIG. 5, accelerometer 200 includes proof mass assembly 201, raised pads 204A-204D (collectively "raised pads 204"), non-moving members 206A and 206B (collectively "non-moving members 206"), bellyband 208, capacitive gap 210, magnets 212A and 212B (collectively "magnets 212"), pole pieces 214A and 214B (collectively "pole pieces 214"), coil 216, and pins 220A and 220B (collectively "pins 220"), which may correspond to proof mass assembly 101, raised pads 104, non-moving members 106, bellyband 108, capacitive gap 110, magnets 112, pole pieces 114, force-rebalancing coils 116, and pins 120, respectively, as described in FIG. 4. In the example of FIG. 5, accelerometer 200 may further include adhesive layers 224A and 224B (collectively "adhesive layers 224"), and second magnets 226A and 226B (collectively "second magnets 226"). In the example of FIG. 5, accelerometer 200 may include accelerometer supports 222A and 222B (collectively "accelerometer supports 222"), which may be formed by a combination of non-moving members 206, magnets 212, pole pieces 214, pins 220, adhesive layers 224, and second magnets 226. For example, accelerometer support 222A may be a combination of a base of non-moving member 206A, magnet 212A, pole piece 214A, pin 220A, adhesive layer 224A, and second magnet 226A. In another example, accelerometer support 222B may be a combination of a base of non-moving member 206B, magnet 212B, pole piece 214B, pin 220B, adhesive layer 224A, and second magnet 226A.

In the example of FIG. 5, magnets 212 have an aperture instead of magnets 112 that have a recess as described in FIG. 4. In some examples, magnets 212 with an aperture instead of a recess may provide easier installation of pins 220. In some examples, magnets 212 may also provide further more accurate matching of accelerometer supports 222 to non-moving members 206 above and below raised pads 204. For example, the heights and combination of CTEs of accelerometer supports 222 having a CTE of a base of non-moving members 106, a CTE of second magnets 226, a CTE of adhesive layers 224, a CTE of magnets 212, and a CTE of pins 220 may substantially match the height and CTE of non-moving members 206 above and below raised pads 204. In some examples, the heights of magnets 212, pins 220, adhesive layers 224, and second magnets 226 may be selected in order to substantially match the height and CTE of non-moving members 106 above and below raised pads 204. It is contemplated in FIG. 5 that accelerometer supports 222 may further include layers of adhesive or other bonding material with an associated height and CTE that is different from the CTEs of the other materials of accelerometer supports 222, which may be incorporated to substantially match the height and CTE of non-moving members 206 above and below raised pads 204.

In some examples, an accelerometer may include a proof mass assembly and an accelerometer support. In these examples, the proof mass assembly may include a proof mass comprising a capacitor plate, and a plurality of raised pads including a center raised pad, wherein the proof mass is configured to displace in response to acceleration applied to the proof mass assembly. In these examples, the accelerometer support may include a portion of a non-moving member, a magnet having a recess and positioned on a first side of the portion of the non-moving member, a pole piece comprising an aperture and positioned on a first side of the magnet, wherein the aperture of the pole piece and the recess of the magnet are aligned, and a pin positioned in the recess of the magnet and the aperture of the pole piece, wherein the pin extends from the recess of the magnet to connect to the center raised pad, wherein a combined height and a combined CTE of the materials of the accelerometer support is configured to substantially match a CTE of material of the non-moving member with a height substantially similar to the combined height of the accelerometer support, and wherein the combined height and the combined CTE of the materials of the accelerometer support is configured to maintain a capacitance gap between the capacitance plate of the proof mass and a second portion of the non-moving member.

In some examples, where the recess of the magnet may be an aperture, the accelerometer support may further include a second magnet, and an adhesive layer, wherein the adhesive layer attaches the second magnet to a second side of the magnet and the second magnet to the first side of the portion of the non-moving member. In these examples, the combined height and the combined CTE of the materials of the accelerometer support comprises a height and a CTE of the portion of the non-moving member, the adhesive layer, the second magnet, and the pin.

Although, FIG. 5 illustrates accelerometer 200 with a capacitive plate on both sides of proof mass assembly 201 to form a combined capacitive pick-off system, it is understood that accelerometer 200 may function with a capacitor plate on only one side of proof mass assembly 201. Similarly, although FIG. 5 illustrates accelerometer 200 with a non-moving member on both sides of proof mass assembly 201 to form the combined capacitive pick-off system, it is understood that accelerometer 200 may function a non-moving member and a capacitor plate on the same side of proof mass assembly 201.

Figure 6:
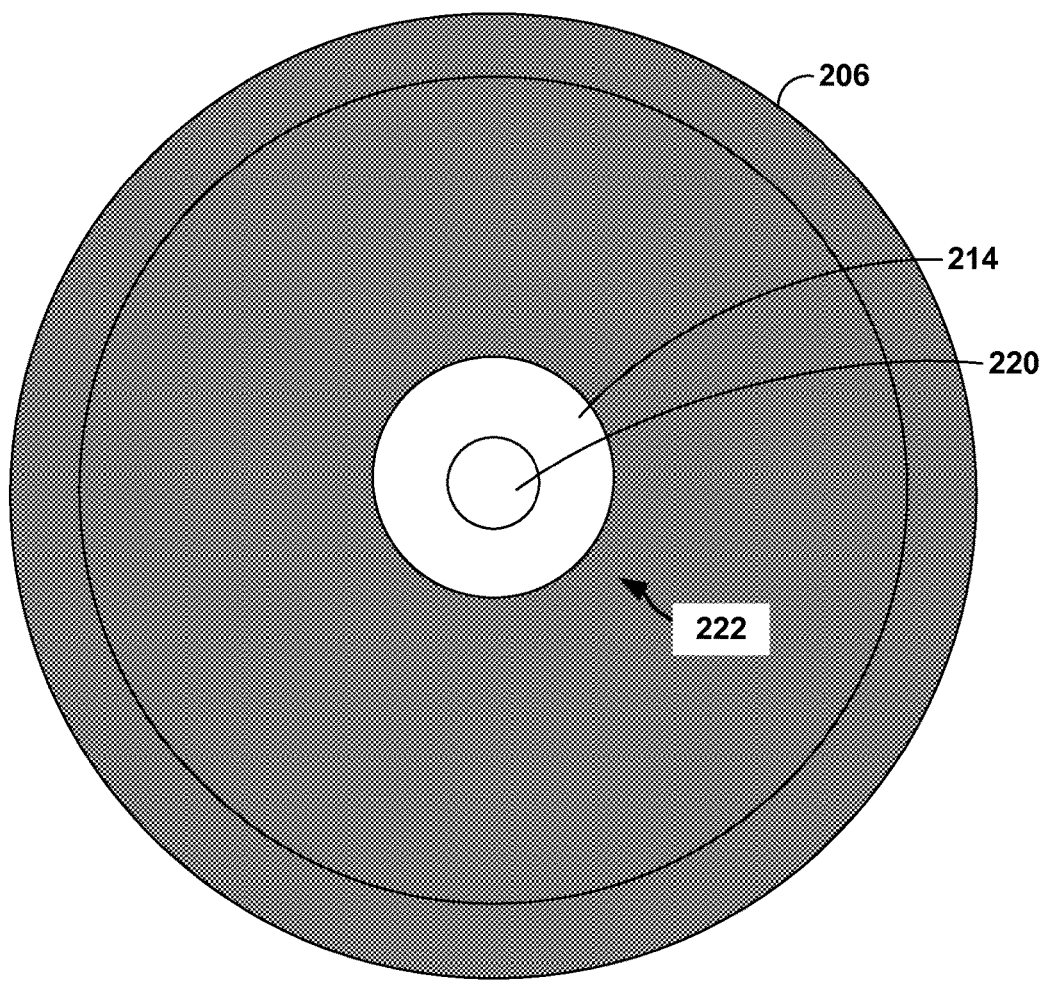
FIG. 6 is a block diagram illustrating an example bottom view of a non-moving member and an accelerometer support, in accordance with the techniques described herein.

FIG. 6 is a block diagram illustrating an example bottom view of non-moving member 206 and accelerometer support 222, in accordance with the techniques described herein. FIG. 6 is described with respect to FIG. 5. In the example of FIG. 6, accelerometer support 222 is located at the geometric center of non-moving member 206 providing a zero gauge length configuration. In the example of FIG. 6, accelerometer support 222 includes pin 220, pole piece 214, a first magnet, an adhesive layer, a second magnet, and the base of non-moving member 106. In some examples, the first magnet, the adhesive layer, and the second magnet may correspond to magnet 212A or 212B, adhesive layer 224A or 224B, and second magnet 226A or 226B, respectively. In the example of FIG. 6, pin 220 may be connected to center raised pad 218 of proof mass assembly 201. In the example of FIG. 6, a combined height and CTE of accelerometer support 222 is configured to substantially match the height and CTE of the outer diameter of non-moving member 206.

In some examples, the height of the magnet below the quartz pin may be determined by determining the CTE of magnet, invar, and fused quartz; determining the dimensions of magnet, pole piece, bond joints and distance from top of pole piece to lapped surface; determining the expansion of invar over a specific height; determining an expansion of a stack of magnet material and quartz of the same specific height, where the variable is the magnet height, and the quartz height is given as the difference in height between the invar dimension and the magnet dimension.

Examples of parameters for performing calculations to determine dimensions to achieve a match of expansion coefficients over the temp range of interest include, for example, the CTE of accelerometer support 122, the CTE of magnet 112, and the CTE of capacitive gap 110. The parameters may also include the height of magnet 112, the height of center raised pads 118, the length of bondlines from non-moving member 106 to magnets 112, the distance from pole pieces 114 to the top of non-moving member 106, and the height from an interior base of non-moving member 106 to the top of non-moving member 106. The parameters may also include the expansion of the stack of magnets 112 and pins 120 from an interior base of non-moving member 106 to a top of non-moving member 106. The calculations may also account for the highest and lowest CTEs of non-moving member 106 in order to account for both a smallest predicted expansion mismatch for non-moving member 106 and a largest predicted expansion mismatch of non-moving member 106. The calculations may also account for the temperature range over which the device will operate.

It should be understood that different applications may allow for or require different sizes of devices, different materials, different operating temperatures, and other such variations. Therefore, it should be understood that the dimensions, materials, temperatures, and other parameters described in this disclosure are merely examples of some implementations, but the techniques of the present disclosure have applicability beyond the specific examples explicitly described herein.

Figure 7:
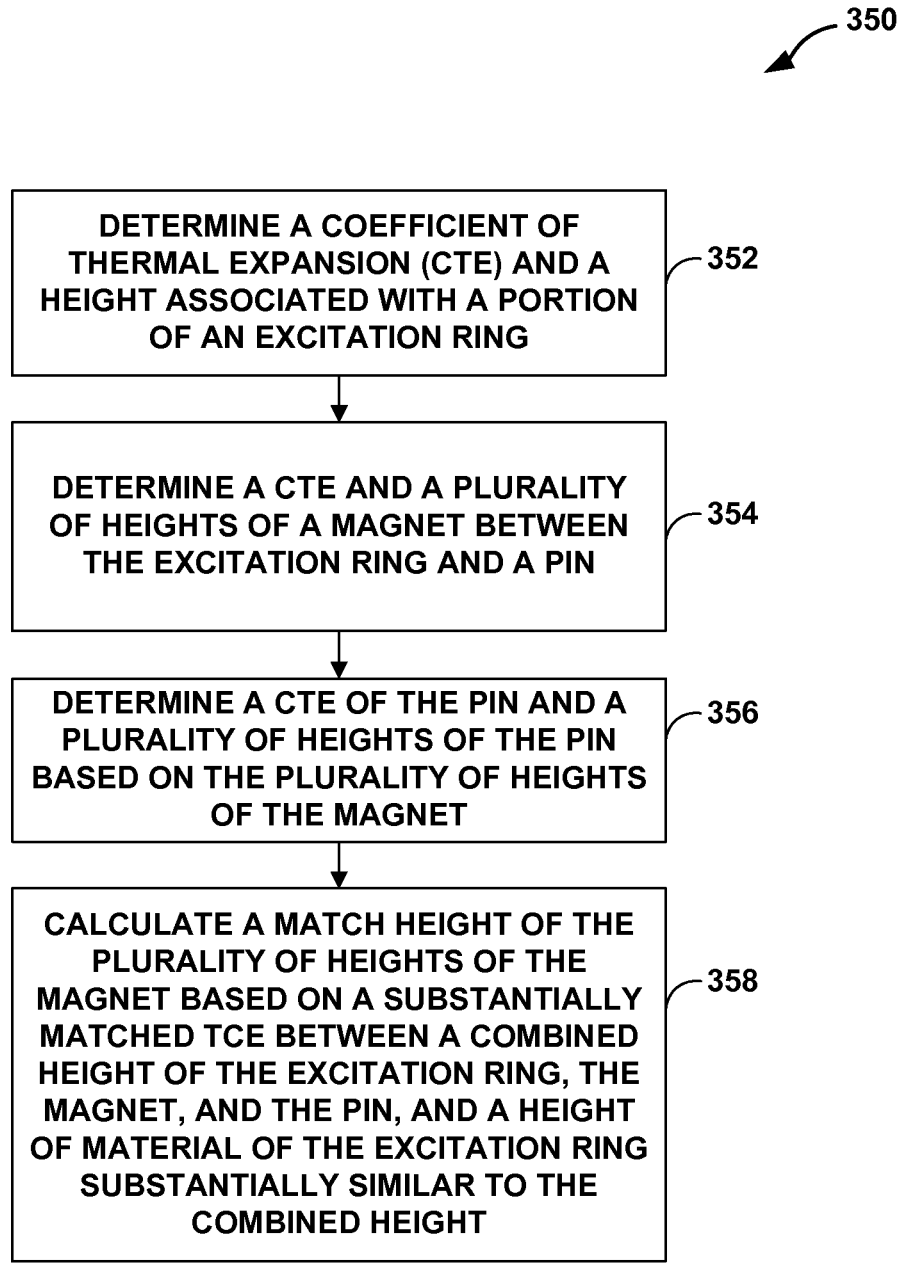
FIG. 7 is a flow chart illustrating example operations for calculating a match height of a magnet of accelerometer support, in accordance with the technique described herein.

FIG. 7 is a flow chart illustrating example operations 350 for calculating a match height of a magnet of accelerometer support, in accordance with the technique described herein. In the example of FIG. 7, a processing device may determine a CTE and a height associated with a portion of a non-moving member (352). In the example of FIG. 7, the processing device may determine a CTE and a plurality of heights of a magnet between the non-moving member and a pin (354). In some examples, the processing device may determine a CTE and a plurality of heights of first and second magnets between the non-moving member and a pin. In these examples, the processing device may also determine a CTE and a height of an adhesive layer between the first and second magnets. In the example of FIG. 7, the processing device may determine a CTE of the pin and a plurality of heights of the pin corresponding to the plurality of heights of the magnet (356). In the example of FIG. 7, the processing device may calculate a match height from the plurality of heights of the magnet based on a substantially matched CTE between a combined height of the non-moving member, the magnet, and the pin, and a height of material of the non-moving member substantially similar to the combined height (358).

In some examples, the processing device may further determine a CTE and a height of one or more bonding materials. In these examples, the one or more bonding materials may attach the portion of the non-moving member to the magnet, and the magnet to the pin. In some examples, the processing device may calculate the match height from the plurality of heights of the magnet based on a substantially matched CTE between a combined height of the non-moving member, the magnet, the pin, and the one or more bonding materials, and a height of material of the non-moving member substantially similar to the combined height.

Proof mass assemblies 1, 41, 71, 101, and 201 configured in accordance with the techniques of this disclosure may include outer hoop 2, 42, and 72 having a plurality of raised pads 4, 44, 74, 104, and 204 on proof mass assemblies 1, 41, 71, 101, and 201 to isolate inner hoop 8, 48, and 88. In some examples, inner hoop 8, 48, and 88 may be configured to isolate proof mass 12, 52, and 82 from outer hoop 2, 42, and 72 and non-moving members 106 and 206. In some examples, outer hoop 2, 42, and 72 may be configured to be more flexible than inner hoop 8, 48, and 88, which may allow outer hoop 2, 42, and 72 to isolate inner hoop 8, 48, and 88, reducing strain transmission to proof mass flexures 14, 54, and 84 of proof mass 12, 52, and 82.

In some examples, raised pads 4, 44, 74, 104, and 204 of outer hoop 2, 42, and 72 may be configured with pad flexures 75. In these examples, the dimensions and placement of pad flexures 75 may maintain resonant modes above two kilohertz (kHz) and may be adjustable in quantity, size, and placement. In some examples, pad flexures 75 may be laser cut to compensate for thermal expansion mismatch between the material of non-moving members 106 and 206 and the material of outer hoop 2, 42, and 72. In some examples, 4, 44, 74, 104, and 204 of outer hoop 2, 42, and 72 may be configured to be symmetrical to reduce bending over temperature. Proof mass assemblies 1, 41, 71, 101, and 201 that use a plurality of 4, 44, 74, 104, and 204 on outer hoop 2, 42, and 72 during construction may provide a more accurate acceleration measurement after construction due to a reduction in thermal model error.

In some examples, inner hoop 8, 48, and 78 may be configured to be suspended from outer hoop 2, 42, and 72 by one or more hoop flexures 6, 46, and 76. In these examples, the dimensions and placement of one or more hoop flexures 6, 46, and 76 may maintain resonant modes above two kHz and may be adjustable in quantity, size, and placement. In some examples, one or more hoop flexures 6, 46, and 76 may be laser cut to isolate strains from the material of outer hoop 2, 42, and 72 from inner hoop 8, 48, and 78 and proof mass 12, 52, and 82. Proof mass assemblies 1, 41, 71, 101, and 201 that use one or more hoop flexures 6, 46, and 76 to suspend inner hoop 8, 48, and 78 from outer hoop 2, 42, and 72 may provide a more accurate acceleration measurement after construction due to reducing thermal strains transmitted to flexures 14, 54, and 84 of proof mass 12, 52, and 82.

In some examples, the dimensions of proof mass 12, 52, and 82 may be configured so that the center of mass of proof mass 12, 52, and 82 is aligned with the geometric center of accelerometer supports 122 and 222. In these examples, the alignment between the center of mass of proof mass 12, 52, and 82 and the geometric center of accelerometer supports 122 and 222 may allow the magnetic circuit of accelerometers 100 and 200 to be symmetrical, which also enables accelerometer supports 122 and 222 to be constructed substantially flat.

In some examples, center raised pad 18, 58, 88, 118, and 218 flexibly connected to inner hoop 8, 48, and 78 may be configured to provide a zero gauge length configuration when connected to accelerometer supports 122 or 222. In other words, center raised pad 18, 58, 88, 118, and 218 and accelerometer supports 122 or 222 may be configured to be in a zero gauge length configuration, such that center raised pad 18, 58, 88, 118, and 218 and accelerometer supports 122 or 222 are located at the center of accelerometers 100 or 200 and the overall forces and/or thermal strains transmitted to proof mass assembly 1, 41, 71, 101, and 201 will be reduced.

In some examples, accelerometers 100 and 200 may also have a dimensionally compensated suspension. For example, the dimensionally compensated suspension may be a combined height and a combined CTE of the different materials of an accelerometer support (e.g., accelerometer supports 122 or 222) that substantially matches a height and a CTE of a material of the non-moving member. For example, accelerometer supports 122 or 222 in the middle of accelerometers 100 and 200 include pins 120 or 220 installed into the center of magnets 112 or 212. In some examples, as the temperature changes, the plane of proof mass assembly 1, 41, 71, 101, and 201 does not deform because of the dimensionally compensated suspension. Since the materials of accelerometer supports 122 and 222 are not the same thermal expansion coefficient, the dimensions must be determined so that the expansion produced by accelerometer supports 122 and 222 equals the expansion of non-moving members 106 and 206 on the outer diameter of proof mass assembly 1, 41, 71, 101, and 201. If both accelerometer supports 122 or 222 and non-moving members 106 or 206 on the outer diameter of proof mass assembly 1, 41, 71, 101, and 201 expand over temperature in tandem, the stresses in accelerometers 100 and 200 are minimized, and accelerometers 100 and 200 provide more accurate acceleration measurements.

Outer hoop 2, 42, and 72, inner hoop 8, 48, 78, and proof mass 12, 52, and 82 of proof mass assemblies 1, 41, 71, 101, and 201 configured in accordance with techniques of this disclosure may be created from a single material, which may reduce the impact of the heating and cooling process during construction, as monolithic (e.g., single material) structures have one CTE. That is, outer hoop 2, 42, and 72, inner hoop 8, 48, 78, and proof mass 12, 52, and 82 may be less subject to bias instabilities and may be more stable when compared to equivalent components of conventional accelerometers. Furthermore, the techniques of this disclosure may allow for more accurate accelerometers with a smaller profile and with reduced costs as the needs for preventing forces and/or strains from construction and other materials is significantly diminished.

In one or more examples, some of the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors (e.g., "processing devices"), such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and/or "processing device," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be provided by a collection of interoperative hardware units, including one or more processors as described above, in conjunction with suitable software and/or firmware.

Various examples of the disclosure have been described. These and other examples are within the scope of the following claims.

The invention claimed is:

1. A proof mass assembly comprising:
    a proof mass;
        an inner hoop surrounding the proof mass, the inner hoop defining a plane;
        an outer hoop surrounding the inner hoop;
        one or more hoop flexures, wherein the one or more hoop flexures flexibly connect the inner hoop to the outer hoop;
        a center pad flexure extending from the inner hoop, wherein a first end of the center pad flexure is coupled to the inner hoop and a second end of the center pad flexure that is opposite the first end is coupled to a center raised pad, and wherein the center pad flexure is flexible in a radial direction and is stiff in a direction normal to the plane defined by the inner hoop; and
        two or more proof mass flexures, wherein the two or more proof mass flexures flexibly connect the proof mass to the inner hoop and allow the proof mass to move out of the plane defined by the inner hoop.

2. The proof mass assembly of claim 1, further comprising a coil attached to the proof mass and the center pad flexure, wherein the proof mass comprises a capacitor plate, and wherein a capacitance center of the capacitor plate is located at a tilt center of the proof mass assembly.

3. The proof mass assembly of claim 1, further comprising a plurality of pad flexures, wherein the plurality of pad flexures are configured to flexibly connect a plurality of raised pads to the outer hoop.

4. The proof mass assembly of claim 3, wherein the plurality of pad flexures isolate thermal forces and strains caused by a coefficient of thermal expansion (CTE) mismatch between material of a non-moving member and material of the outer hoop.

5. The proof mass assembly of claim 3, wherein a dimension and a placement of each pad flexure of the plurality of pad flexures maintain resonant modes of the proof mass assembly above two kilohertz (kHz).

6. The proof mass assembly of claim 3, wherein the outer hoop comprises a circular shape, and wherein each pad flexure of the plurality of pad flexures is flexible in a radial direction of the outer hoop and stiff in a circumferential direction and a direction normal to the plane of the outer hoop.

7. The proof mass assembly of claim 1, wherein a dimension and a placement of each hoop flexure of the one or more hoop flexures maintains resonant modes of the proof mass assembly above two kilohertz (kHz).

8. The proof mass assembly of claim 1, wherein the center pad flexure isolates thermal forces and strains caused by a CTE mismatch between materials of an accelerometer support and a material of the inner hoop.

9. The proof mass assembly of claim 1, wherein the one or more hoop flexures are configured to isolate the proof mass and the inner hoop from forces and thermal strains of the outer hoop, and wherein the two or more proof mass flexures are configured to isolate the proof mass from forces and thermal strains of the inner hoop.

10. The proof mass assembly of claim 1, wherein a center of mass of the proof mass is located substantially near a geometric center of the proof mass assembly.

* * * * *